UNITED STATES PATENT OFFICE.

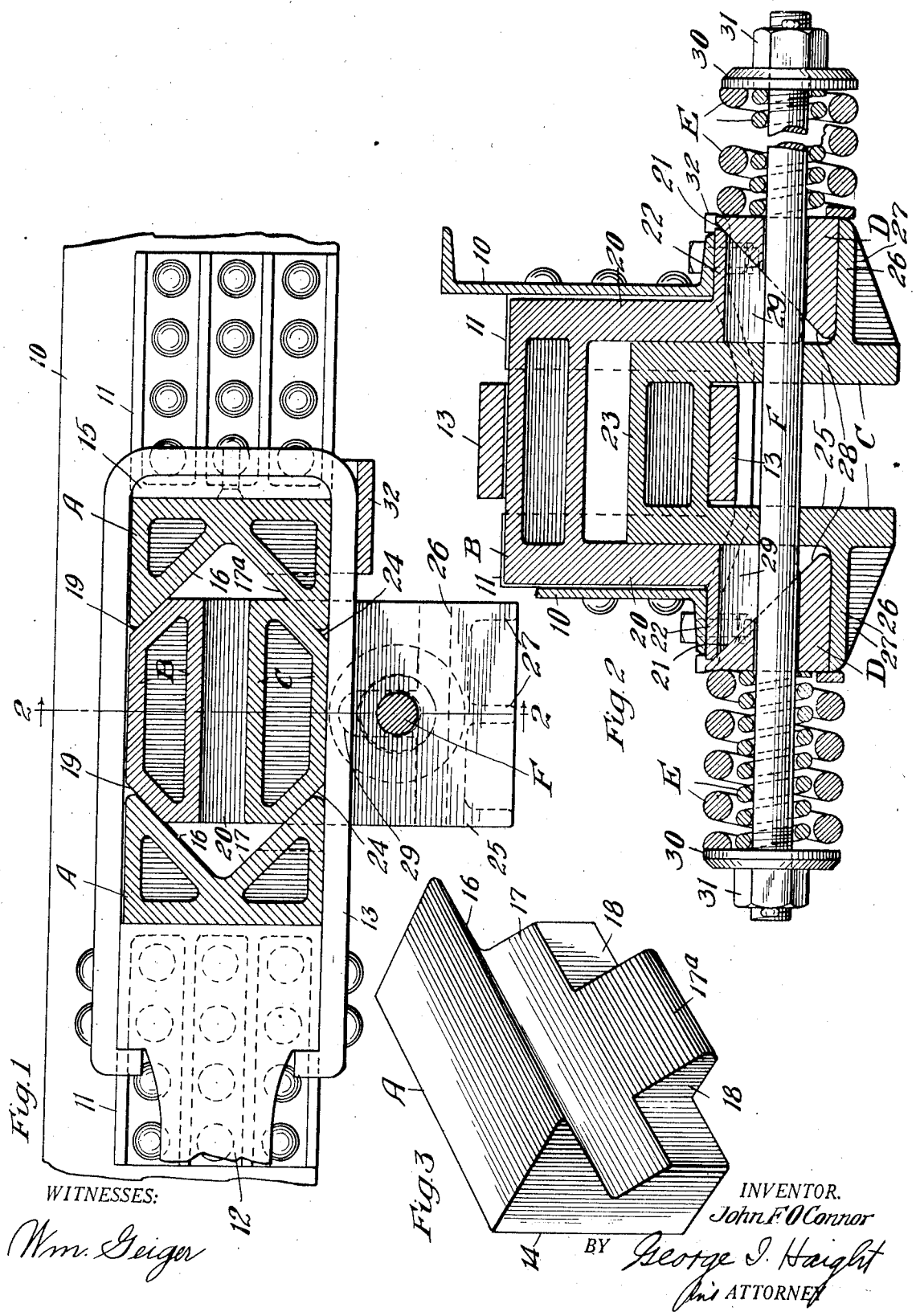

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,345,393.   Specification of Letters Patent.   Patented July 6, 1920.

Application filed January 20, 1919. Serial No. 271,943.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a relatively inexpensive friction shock absorbing mechanism composed of few parts, the friction members being easily manufactured commercially in the form of castings.

Another object of the invention is to provide a friction shock absorbing mechanism more especially adapted for railway draft riggings and wherein the over-all length is relatively short to thereby adapt the mechanism for short spacing encountered in many cars now in service, such as tank cars, wherein the distance between stops is quite commonly $18\frac{1}{2}''$.

Another and more specific object of the invention is to provide a friction shock absorbing mechanism adapted for railway draft riggings wherein the springs are disposed outside of the sills but without the necessity of slotting the latter, as has heretofore been customary in certain types of friction gears.

In the drawing forming a part of this specification, Figure 1 is a part elevational view, part longitudinal section of a portion of a railway draft rigging showing my improvements in connection therewith. Fig. 2 is a vertical, transverse, sectional view, taken substantially on the line 2—2 of Fig. 1. And Fig. 3 is a detail perspective of one of the follower friction wedge members.

In said drawings, 10—10 denote channel-shaped draft sills of a railway car provided on their inner faces with stop lugs 11—11 which may be of any desired or well known form. In the illustration shown, the space between the stop shoulders of the lugs 11—11 is that corresponding to $18\frac{1}{2}''$. As shown, the draft rigging includes a draw bar 12 of usual form and a strap yoke 13 preferably riveted thereto.

The improved friction mechanism, as illustrated, includes two wedge followers A—A, friction shoes B and C, friction wedge shoes D—D, a pair of springs E—E and a bolt F.

Each of the wedge followers A is provided with an outer plain face 14 adapted to be engaged either by the butt of the draw bar or the filler block 15 of the yoke and on its interior is formed with oppositely extending friction wedge faces 16 and 17. The bottom portion of each wedge follower A is cut away on each side of the center thereof, as indicated at 18—18 so as to leave a centrally disposed extended wedge face $17^a$. The followers A are cut away at 18, as previously described, in order to permit the extended portions $17^a$ to pass between the depending arms of the friction block C, hereinafter described.

The friction shoe B is provided near the top thereof with a pair of transversely extending, oppositely arranged friction faces 19—19 adapted to coöperate with the friction wedge faces 16 of the wedge followers A. In addition, the friction shoe B is formed with depending side arms 20—20, each of the latter having at its lower end a wedge 21 formed thereon, the wedge extending outwardly partly beneath the lower flanges of the draft sills 10. As clearly indicated in Fig. 2, the width of the friction shoe B is slightly less than the distance between the draft sills. In normal position of the parts, the horizontal upper face 22 of each wedge section of the shoe B engages the lower adjacent flange of the draft sill.

The friction shoe C has an upper transversely extending section 23 which slides vertically between the arms 20 of the shoe B. At its ends, the section 23 of the shoe C is formed with oppositely disposed wedge friction surfaces 24—24 coöperable with the wedge sections $17^a$ of the followers A. The shoe C is also provided with a pair of downwardly extending side arms 25—25 which straddle the lower arm of the yoke 13. Said side arms are provided at the bottom thereof with horizontally and outwardly extended flanges 26—26, the latter being suitably braced by ribs 27—27.

The side arms 25 of the shoe C are perforated to accommodate the bolt F which extends therethrough. Mounted on the bolt F are the two springs E and the triangleshaped wedge blocks D—D, there being one on each side of the shoe C. Each wedge block D is provided with a wedge face 28 which coöperates with the corresponding wedge section 21 of the shoe B. The wedge sections 21 of the shoe B are suitably vertically recessed, as indicated at 29 in Fig. 1, in order to straddle the bolt F and permit relatively vertical movement between the bolt and the shoe B. Suitable washers 30 and nuts 31 are applied on the ends of the bolt F to hold the springs E in place. The weight of the friction mechanism may be sustained by any suitable means such as the detachable saddle plate 32 which is preferably detachably bolted to the lower flanges of the draft sills.

The normal position of the parts is as shown in Figs. 1 and 2. In operation and upon inward movement of the draw bar, it is evident that the front wedge follower A will approach the rear wedge follower A. This relative movement of the wedge followers A—A in a horizontal direction parallel to the line of draft will force the friction shoes B and C toward each other in a vertical direction. As the shoes B and C approach each other vertically, it is evident that the wedge sections 21 of the shoe B will force the wedge blocks D laterally outwardly in a horizontal direction which is transverse to the line of draft, thus compressing the springs E as will be apparent. The release will be understood without detailed description.

From the preceding description taken in connection with the drawings, it will be evident that I have provided large wearing areas as follows: Between the wedge followers A and the shoes B and C, between the wedge sections 21 and wedge blocks D, and between the wedge blocks D and the horizontal flanges 26 of the shoe C. It will also be noted that all of the friction members may be readily cast, and for lightness, the parts are preferably cored as clearly indicated in Figs. 1 and 2 of the drawing. With the arrangement shown, I am enabled to place the friction mechanism between relatively close stops, and the springs are disposed outside of the space usually occupied by the draft gear between the sills and this location of the springs is accomplished without the necessity of slotting the sills with consequent danger of weakening the latter.

I claim:

1. A friction shock absorbing mechanism comprising; spring means, and a plurality of friction members, said friction members including, a set of friction elements relatively movable toward and from each other in one direction, a second set of friction elements relatively movable toward and from each other in a direction at right angles to the first named direction and coöperable with said first named set of friction elements, and a third set of friction elements relatively movable toward and from each other in a direction at right angles to both of the other said directions, the last named friction elements coöperable with said second set of friction elements and acting on said spring means to compress the latter.

2. A friction shock absorbing mechanism adapted for railway draft riggings, said mechanism comprising; spring means, and a plurality of friction members, said friction members including, a set of friction elements relatively movable horizontally parallel to the line of draft, a second set of friction elements relatively movable in a vertical direction and coöperable with said first named set of horizontally movable friction elements, and friction elements relatively movable in a horizontal direction at right angles to the line of draft and directly coöperable with said second set of friction elements.

3. A friction shock absorbing mechanism comprising; end friction members having friction wedge faces on their inner sides, friction members having wedge faces coöperable with said wedge faces of the end members and provided with portions extending to one side of said end friction members, additional friction members coöperable with said extended portions of both of said second named friction members, and spring means co-acting with the last named friction members.

4. A friction shock absorbing mechanism comprising; a pair of end wedge followers movably relatively toward and from each other, an interposed pair of friction members coöperable with the end members, one of said interposed friction members having wedges formed on its said extended portions, wedge blocks coöperable with said wedges, and spring means acted upon by said wedge blocks.

5. A friction shock absorbing mechanism comprising; a pair of wedge end blocks, an interposed pair of relatively movable friction members, spring means supported by one of said friction members, and friction wedge means interposed between said spring means and the other of said friction members.

6. A friction shock absorbing mechanism adapted for railway draft riggings having draft sills and stop-acting means, said mechanism comprising; end wedge followers relatively movable in a horizontal direction parallel to the center line of draft, interposed friction members relatively movable vertically, friction wedge blocks supported by one of said friction members, means on the other end of said friction members coöperable with said wedge blocks to actuate the blocks upon relative approach of said followers, and spring means coöperable with said wedge blocks.

7. In a railway draft rigging, the combination with draft sills, draw bar, yoke-acting means, and stop-acting means, of front and rear followers having wedge faces on their inner sides, relatively vertically movable friction shoes coöperable with said followers, a spring extending transversely of the sills, and means interposed between said spring and said vertically movable friction shoes arranged to compress the spring laterally upon relative approach of the followers.

In witness that I claim the foregoing I have hereunto subscribed my name this 5th day of Jan. 1919.

JOHN F. O'CONNOR.